(12) United States Patent
Okada

(10) Patent No.: US 7,424,073 B2
(45) Date of Patent: Sep. 9, 2008

(54) ORTHOGONAL FREQUENCY DIVISION MULTIPLEXING (OFDM) RECEIVER, OFDM RECEIVING CIRCUIT AND OFDM DIVERSITY RECEPTION METHOD

(75) Inventor: Kunio Okada, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 647 days.

(21) Appl. No.: 10/973,860

(22) Filed: Oct. 26, 2004

(65) Prior Publication Data

US 2005/0111600 A1    May 26, 2005

(30) Foreign Application Priority Data

Oct. 28, 2003    (JP)    ............... 2003-367193

(51) Int. Cl.
*H04B 7/10* (2006.01)
*H04L 1/02* (2006.01)
*H04L 27/00* (2006.01)

(52) U.S. Cl. ................. 375/347; 375/349; 370/206

(58) Field of Classification Search ......... 375/259–260, 375/340, 347, 349; 370/206, 210
See application file for complete search history.

(56) References Cited

U.S. PATENT DOCUMENTS

| | | | |
|---|---|---|---|
| 5,973,642 A * | 10/1999 | Li et al. | 342/378 |
| 6,327,314 B1 * | 12/2001 | Cimini et al. | 375/340 |
| 6,654,429 B1 * | 11/2003 | Li | 375/316 |
| 7,099,265 B2 * | 8/2006 | Kuwabara et al. | 370/203 |
| 7,173,990 B2 * | 2/2007 | Kim et al. | 375/347 |
| 7,242,720 B2 * | 7/2007 | Sugiyama et al. | 375/260 |
| 2003/0185320 A1 | 10/2003 | Ueno et al. | |

FOREIGN PATENT DOCUMENTS

| | | |
|---|---|---|
| EP | 0 903 898 A | 3/1999 |
| JP | 2000-036801 A | 2/2000 |
| JP | 2001-285156 A | 10/2001 |
| JP | 2002-271291 A | 9/2002 |
| JP | 2002-368714 A | 12/2002 |
| JP | 2003-087213 A | 3/2003 |

OTHER PUBLICATIONS

Chinese Office Action dated Jan. 6, 2006 Issued In Chinese Appln. No. 200410087904.9. English translation and Chinese language Office Action attached.

* cited by examiner

*Primary Examiner*—Jean B Corrielus
(74) *Attorney, Agent, or Firm*—Frishauf, Holtz, Goodman & Chick, P.C.

(57) ABSTRACT

An Orthogonal Frequency Division Multiplexing (OFDM) signal having a symbol defining a transmission unit is produced by dividing data streams into a plurality of carriers within a predetermined bandwidth and prepared with orthogonal modulation. A transform unit having at least two systems transforms the received OFDM signal to a carrier domain signal per symbol unit. A composite circuit segments the carrier units and adaptively composites the signal data which constitutes a plurality of different carriers transformed by a first system transform circuit and the signal data which constitutes a plurality of different carriers transformed by a second system transform circuit for each identical carrier in each system.

3 Claims, 5 Drawing Sheets

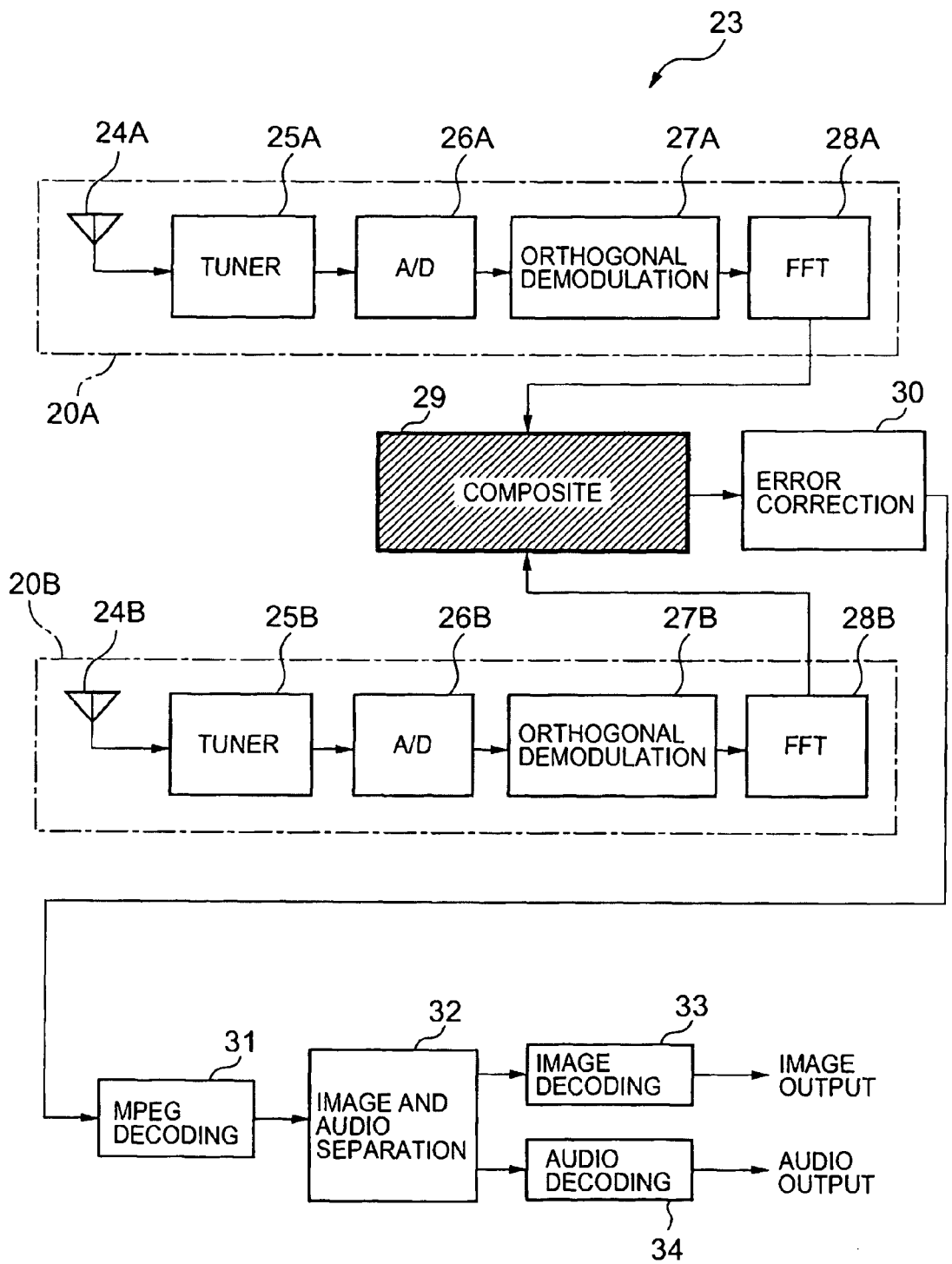

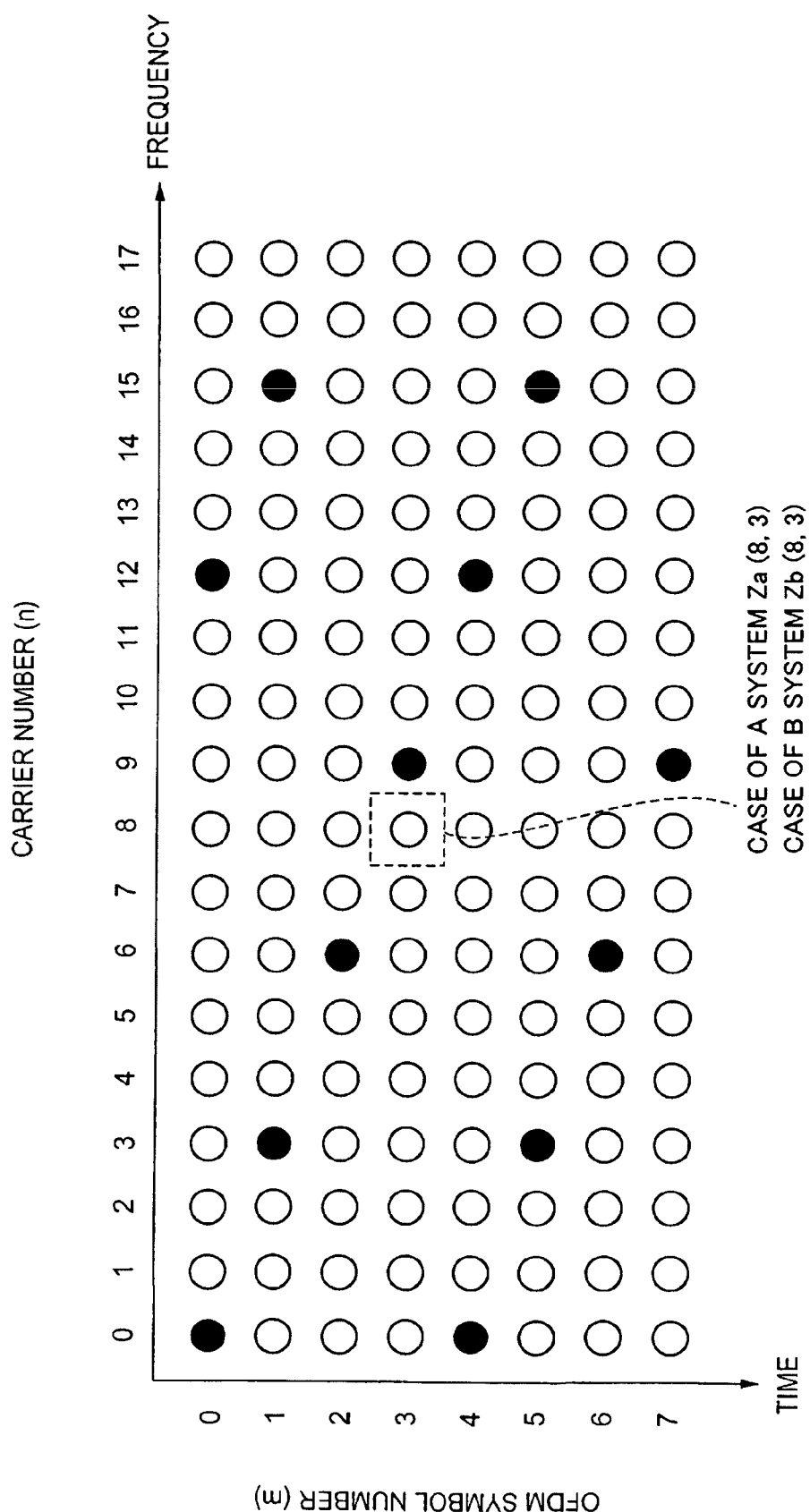

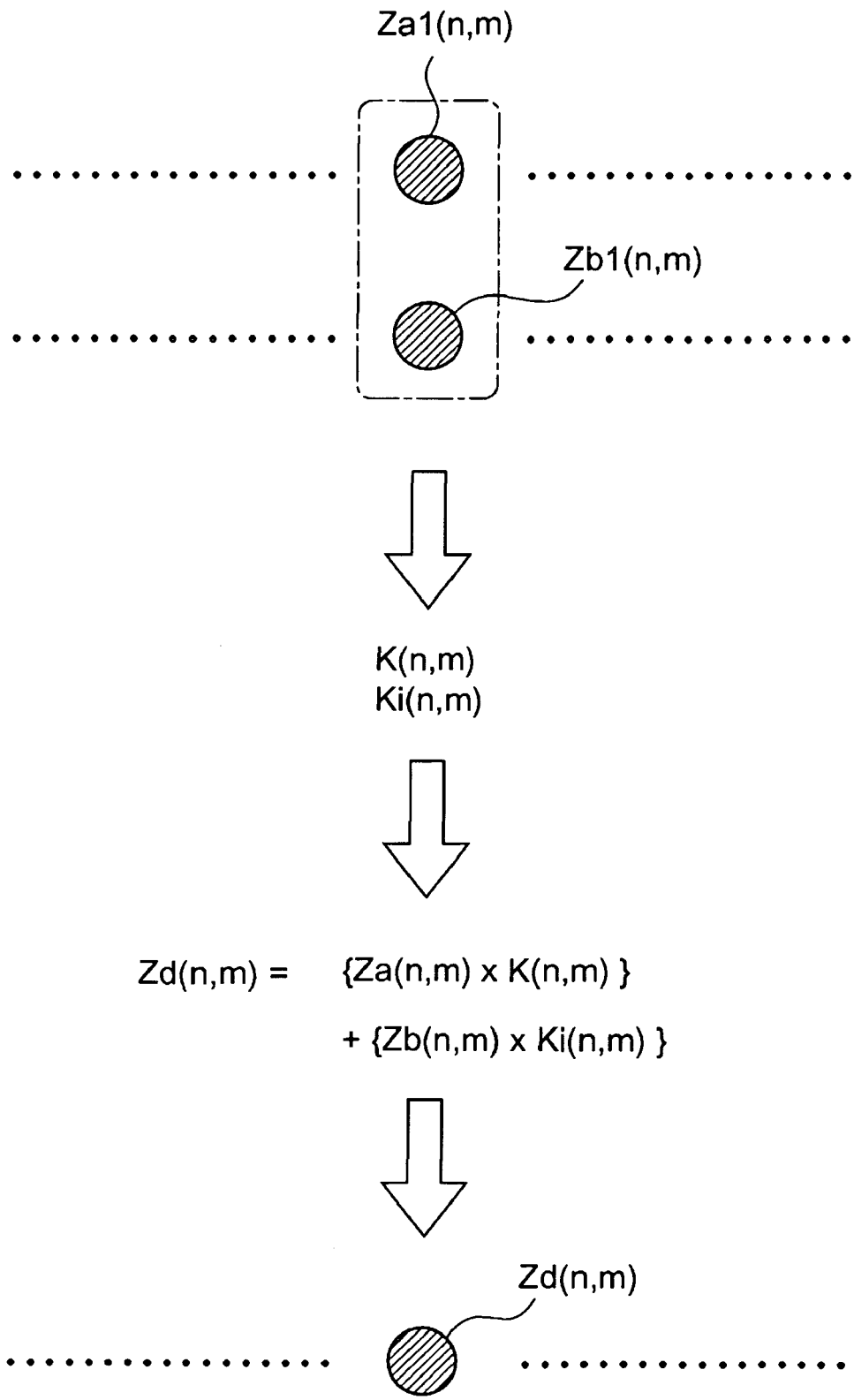

ORTHOGONAL FREQUENCY DIVISION MULTIPLEXING (OFDM) RECEIVER, OFDM RECEIVING CIRCUIT AND OFDM DIVERSITY RECEPTION METHOD

CROSS-REFERENCE TO RELATED APPLICATION

This application is based upon and claims the benefit of priority from the prior Japanese Patent Application No. 2003-367193, filed Oct. 28, 2003, the entire contents of which is incorporated herein by reference.

BACKGROUND OF THE INVENTION

1. Field of the Invention

The present invention relates to an Orthogonal Frequency Division Multiplexing (OFDM) receiver, OFDM receiving circuit and an OFDM reception method using diversity, and more particularly relates to an OFDM receiver, OFDM receiving circuit and an OFDM diversity reception method which lowers the error rate and enhances the reception quality level.

2. Description of the Prior Art

OFDM is a modulation technique that enables transmission of a large number of individual carrier waves, commonly called carriers, at a high spectral density level which are orthogonally spaced in frequency and therefore do not interfere with each other within a transmission bandwidth. The data streams are allocated in the amplitude and phase of each carrier and digital modulation is implemented, such as Phase Shift Keying (PSK), Quadrature Amplitude Modulation (QAM), etc. For example, the digital terrestrial broadcasting standard (ISDB-T: Integrated Services Digital Broadcasting-Terrestrial) in Japan allocates 6 MHz of frequency spectrum per channel and each 6 MHz bandwidth is divided into 13 parts called segments. In this manner, by orthogonally multiplexing a plurality of carriers in each segment, High Definition Television (HDTV) broadcasting, Standard Television (SDTV) broadcasting and simplified broadcasting for mobile applications can be accomplished.

Furthermore, the OFDM receiver uses a diversity system for improving reception capability. This technique receives radio waves transmitted by a broadcasting station with multiple antennas. Maximum value composite signal processing is performed with these multiple antennas and the highest signal reception quality (referred to as C/N or Carrier to Noise Ratio which is the measured ratio in dB) is always chosen and outputted. Subsequently, the highest signal reception quality is transformed into a digital signal and demodulation processing is performed in a demodulator circuit. Thus, the effect of fading on transmission lines, etc. is kept to a minimum.

However, in the conventional diversity system mentioned above, there is a drawback with sufficient reception quality for accurately and reliably demodulating the received data in a multipath situation which often occurs between large urban buildings, etc. particularly since diversity is performed based on the time domain signal.

SUMMARY OF THE INVENTION

Therefore, the present invention features an OFDM signal received with multiple antennas which undergoes Fast Fourier Transform (FFT) processing in respective circuits and additional composite processing of the signal after FFT processing.

Accordingly, the received data can be accurately and reliably demodulated with a lower error rate to enhance reception quality.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 1 is a conceptual block diagram of an OFDM receiver 23 using diversity in the present invention;

FIG. 2 is an image diagram of an OFDM carrier domain signal outputted from FFT sections 28A and 28B in the present invention;

FIG. 4 is a conceptual diagram of the operation of a composite section 29 in the present invention;

DETAILED DESCRIPTION OF THE PREFERRED EMBODIMENTS

Figure 3A:
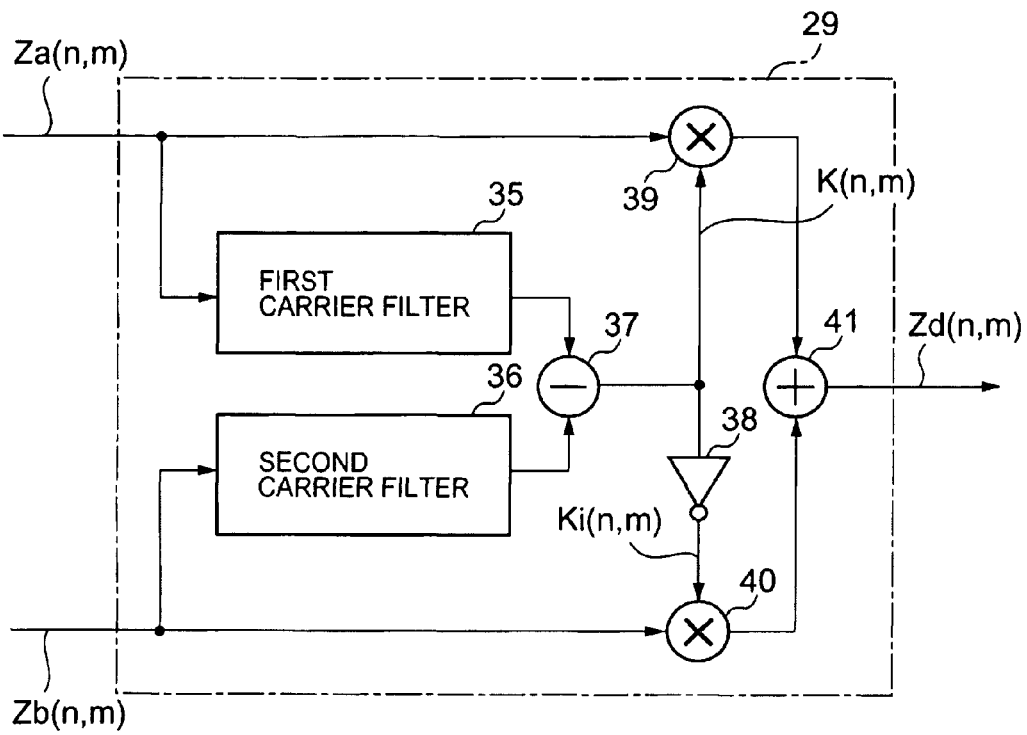
FIG. 3A is a block diagram of a composite section 29 for generating a composite signal of an "A" system output signals and a "B" system output signals in the present invention.

The preferred embodiments of the present invention will hereinafter be described in detail with reference to the drawings. In the following explanation, the various specific details or examples, numerical values or character strings and other illustrative notations are intended as reference for performing the concept of the present invention. Accordingly the ideology of this invention as a whole or in part is not limited to this. Additionally, although explanation avoids covering the details regarding a well-known technique, a well-known procedure, a well-known architecture and a well-known circuit configuration (hereinafter denoted as a "common knowledge") for keeping the explanation succinct, these common knowledge particulars as a whole or in part are not intentionally excluded. Since a person skilled in the art can recognize such common knowledge at the time of filing the present invention, naturally certain references are included in the following explanation.

FIG. 1 is a conceptual block diagram of an OFDM receiver 23 which applies the present invention to a terrestrial digital broadcasting receiver. Referring to FIG. 1, an OFDM receiver 23 comprises common circuit sections for an "A" system and a "B" system comprised of two system circuit sections denoted as an "A" system circuit section 20A and a "B" system circuit section 20B, a composite section 29, an error correction section 30, a Moving Picture Experts Group (MPEG) decoding section 31, an image and audio separation section 32, an image decoding section 33 and an audio decoding section 34. The "A" system and the "B" system configurations are identical with the "A" system comprising an antenna 24A, a tuner 25A, an Analog/Digital (A/D) converter 26A, an orthogonal demodulation section 27A and a Fast Fourier Transform (FFT) section 28A, and with the "B" system similarly comprising an antenna 24B, a tuner 25B, an A/D converter 26B, an orthogonal demodulation section 27B and a FFT section 28B.

An OFDM signal delivered from an unshown transmitting station is received by the two antennas 24A, 24B and supplied to each of the tuners 25A, 25B as a high frequency signal (RF signal: Radio Frequency signal). Afterwards, the high frequency signal is changed to a predetermined intermediate frequency signal (IF signal; Intermediate Frequency signal) by each of the tuners 25A, 25B and then converted into a digital signal with the A/D converters 26A, 26B. This digital signal is sent to the orthogonal demodulation sections 27A, 27B. In the orthogonal demodulation sections 27A, 27B, orthogonal demodulation processing is implemented to recover the signal from the carrier (sum of a number of individual carrier signals) having substantially the same characteristics as the original orthogonal modulation processing of the broadcasting station. The signal following orthogonal demodulation is an OFDM symbol domain signal (time domain) prior to a FFT operation. The OFDM symbol domain signal is a complex signal containing a real axis component (I channel signal) and an imaginary axis component (Q channel signal) by undergoing orthogonal demodulation.

Next, the OFDM symbol domain signal is sent to the FFT sections 28A, 28B and transformed into an OFDM carrier domain signal (frequency domain) constituted from the signal data of a plurality of different carrier waves (hereinafter denoted as carriers) by the FFT sections 28A, 28B. The FFT sections 28A, 28B extract and output the data following orthogonal modulation of each carrier. Specifically, the FFT sections 28A, 28B extract the range of effective symbol length, namely, the length (for example, 2048 samples of carrier data) indicating the number of useful samples from one OFDM symbol, without the cyclic preamble or the guard interval period on the initial part of the symbol. An FFT operation is then generated relative to the OFDM symbol domain signal relative to this range. In this manner, an OFDM carrier domain signal is outputted from FFT sections 28A, 28B, as well as the above-mentioned OFDM symbol domain signal which is complex that contains a real axis component and an imaginary axis component.

The OFDM carrier domain signal, which constitutes the signal data of a plurality of different carriers outputted from the FFT sections 28A, 28B of the "A" system and the "B" system, is segmented into carrier units by the composite section 29 and adaptively composites each identical carrier in each system.

Next, the composite signal is processed by the error correction section 30 for implementing error correction, such as Viterbi decoding, Reed-Solomon (RS) code, etc. Following error correction, the MPEG decoding section 31 performs MPEG expansion of the signal. After MPEG expansion, the image and audio separation section 32 separates the image signal and audio signal. The image decoding section 33 performs decode processing of the image signal and the audio decoding section 34 performs decode processing of the audio signal. Lastly, the signal is outputted to an image and audio reproduction section (or image and audio recording section) (not shown).

Hereinafter, an OFDM carrier domain signal outputted from the FFT 28A of the "A" system is expressed with Za (n,m) and an OFDM carrier domain signal outputted from the FFT 28B of the "B" system is expressed with Zb (n,m).

FIG. 2 is an image diagram of an OFDM carrier domain signal outputted from FFT sections 28A and 28B in the present invention. Referring to FIG. 2, the carrier is shown as "frequency" in the horizontal direction and the "carrier number (n)" is lined up a long this horizontal direction. Also, the symbol is shown "time" in the vertical direction and the "OFDM symbol number" is lined up along this vertical direction. The black dots denote a carrier called known power and a synchronizing signal (Scattered Pilot or SB signal) with phase information. The white circles denote a carrier in which a synchronizing signal is not inserted. As shown in FIG. 2, a synchronizing signal is inserted (at intervals) discretely at the rate of one every twelve carriers in the frequency axis direction, and is inserted for each symbol in the time axis direction such that the synchronizing signal is shifted by three pixels in the frequency axis direction with respect its position in the previous symbol in the time axis direction.

The position of random carriers can be expressed with the intersection coordinates as the symbol number (m) and the carrier number (n). For example, as shown in the diagram with one carrier enclosed with a dashed line frame is n=8, m=3. In this case, an OFDM carrier domain signal outputted from the FFT section 28A of the "A" system becomes Za (n, m)→Za (8, 3) and similarly an OFDM carrier domain signal outputted from FFT section 28B of the "B" system becomes Zb (n, m)→Zb (8, 3).

FIG. 3A is a block diagram of the composite section 29 for generating a composite signal of the "A" system output signals and the "B" system output signals. Referring to FIG. 3A, the composite section 29 comprises a first carrier filter 35, a second carrier filter 36, a difference calculation element 37, a sigh inverter element 38, a first multiplier element 39, a second multiplier element 40, and an adder element 41.

The composite section 29 comprises n circuits (not shown) which constitute the configuration of FIG. 3A. Namely, the previously mentioned n circuits are set to each demodulated carrier. An OFDM carrier domain signal outputted from FFT sections 28A, 28B, is segmented into carrier units (transmission units) by the composite section 29 according to each circuit set to each of the above-mentioned demodulated carriers and adaptively composites each identical carrier in each system.

Figure 3B:
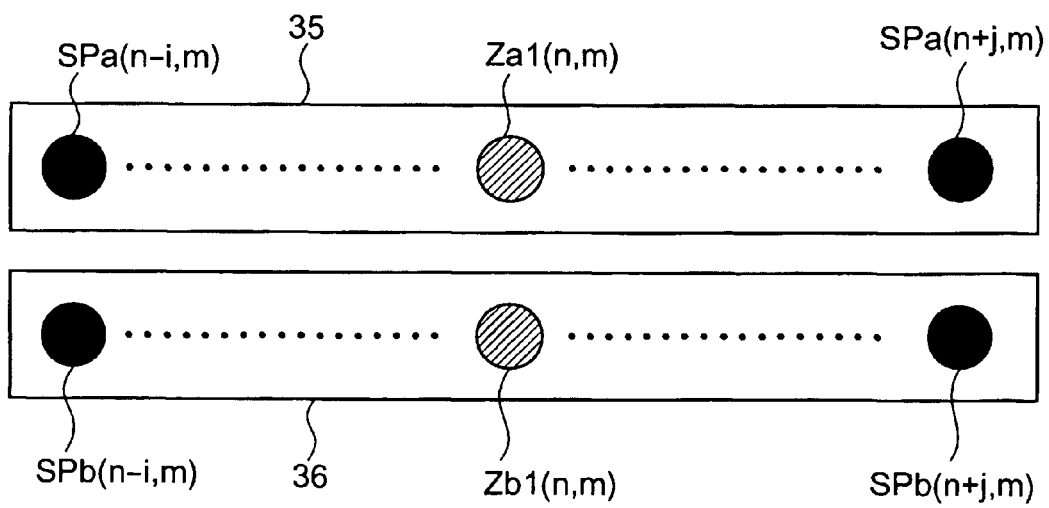
FIG. 3B is a conceptual diagram of the operation in a first carrier filter 35 and a second carrier filter 36 in the present invention.

FIG. 3B is a conceptual diagram of the operation in the first carrier filter 35 and the second carrier filter 36. The oblong rectangular frame border of FIG. 3B typically illustrates the first carrier filter and the second carrier filter. The circle pattern with hatching represents a carrier of a processing object and the black dot pattern before and after that is a synchronizing signal.

Presently, the first carrier filter 35 calculates the estimated value Za1 (n, m) of the transmission characteristics for a processing object Za (n, m) from known transmission characteristics (signal power and phase) on two synchronizing signals SPa (n−i, m) and SPa (n+j, m) that are positioned before and after a random carrier number (n) in a random symbol number (m). Similarly, the second carrier filter 36 calculates the estimated value Zba1 (n, m) of the transmission characteristics for a processing object Zb (n, m) from known transmission characteristic data on two synchronizing signals SPb (n−i, m) and SPb (n+j, m) that are positioned before and after a random carrier number (n) in a random symbol number (m). Here, "a" indicates the "A" system signal and "b" the "B" system signal. Also, "i" and "j" represent the interval (the number of carriers) of the before and after synchronizing signal and the processing object carrier.

The difference calculation element 37 calculates the difference of each output of the first carrier filter 35 and the second carrier filter 36. That is, Za1 (n, m)−Zb1 (n, m) is calculated. When this calculation result is performed to K (n, m), the sign inverter element 38 reverses the sign of K (n, m) and outputs the sign reversal result (i.e., the reciprocal of K (n, m)) as Ki (n, m). The first multiplier element 39 calculates Za (n, m)×K (n, m), and the second multiplier element 40 calculates Zb (n, m)×Ki (n, m). Lastly, the adder element 41 adds the operation results of the first multiplier element 39 and the second multiplier element 40. This addition result is outputted to the latter error correction section 30 as a composite signal Zd (n, m) which is a composite of the "A" system output signal and the "B" system output signal. The error correction section 30 accomplishes error correction processing, such as Viterbi decoding, Reed-Solomon (RS) code, etc. relative to the outputted composite signal Zd (n, m).

FIG. 4 is a conceptual diagram of the operation of the composite section 29. Referring to FIG. 4, Za1 (n, m) is an output signal of the first carrier filter 35 and Zb1 (n, m) is an output signal of the second carrier filter 36. The difference value K (n, m) of these signals is calculated by the difference calculation element 37 and the sign reversal value Ki (n, m) of the difference value is calculated with the sign inverter element 38.

Further, by the first multiplier element 39, the second multiplier element 40 and the adder element 41, calculates Zd (n, m)={Za (n, m)×K (n, m)}+{Zb (n, m)×Ki (n, m)} and is outputted to the latter circuit.

At this stage, in relation to a hindrance on a transmission line, for example, supposing a difference arises between "A" system signals Za (n, m) and "B" system signals Zb (n, m), the difference will reflect in K (n, m) and Ki (n, m). Then, the composite signal Zd (n, m) which eliminates the above-mentioned difference can be acquired by compensating the "A" system signal Za (n, m) and "B" system signal Zb (n, m) using "K (n,m) and Ki (n, m)" as a correction value which indicates the above-mentioned difference.

Accordingly, in this embodiment, since composite processing is effected to each transmission unit (carrier unit) of an OFDM signal as explained above, loss of OFDM signal data (carrier) accompanied by composite processing is not generated. Furthermore, since such composite processing can be accomplished on all carriers including carriers with a non-inserted synchronizing signal, it is a practicable method to particularly lower the error rate and improve reception quality (C/N). Thus, the reception efficiency of an OFDM receiver using diversity can be markedly enhanced.

Figure 5A:
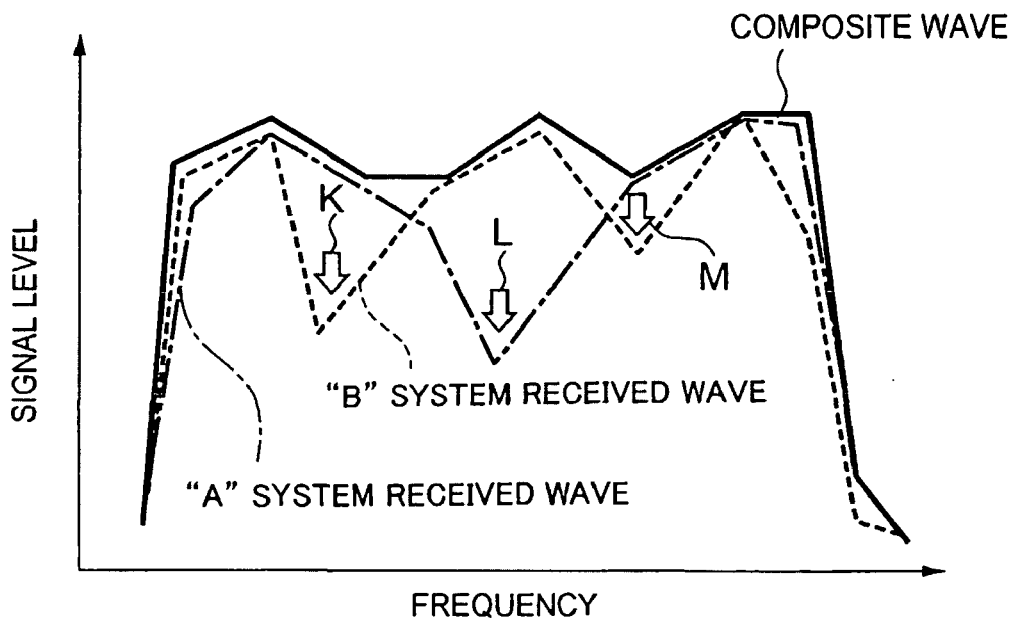
FIG. 5A is a result diagram of the embodiment in the present invention.
Figure 5B:
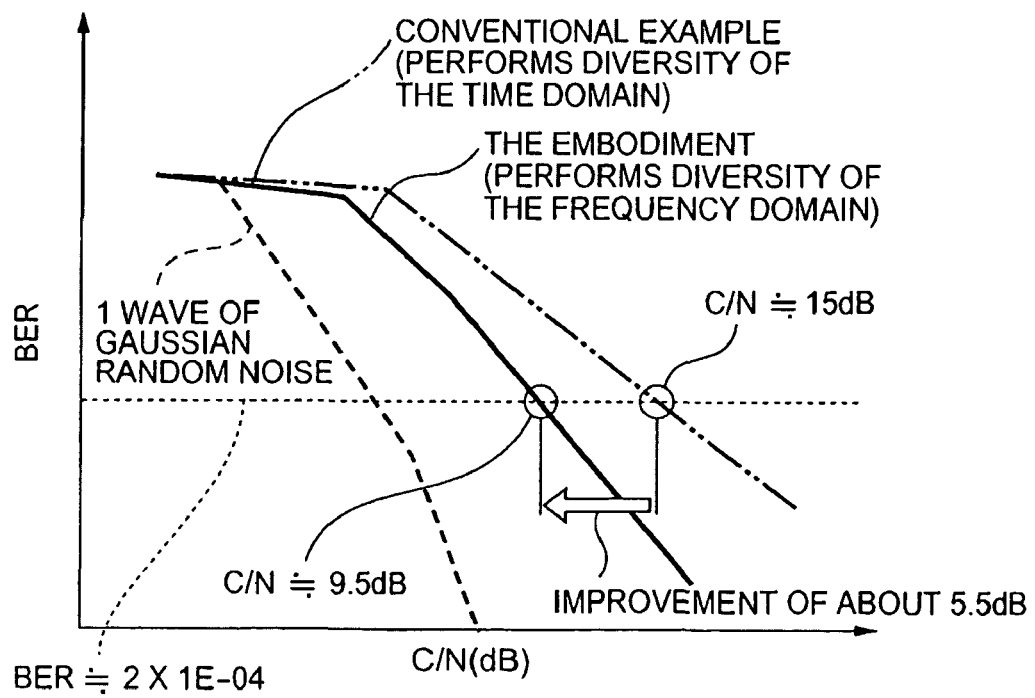
FIG. 5B is a result diagram of the embodiment in the present invention.

FIGS. 5A and 5B are result diagrams of the embodiment. Referring to FIG. 5A, the signal level of "A" system received wave and "B" system received wave are shown in the vertical direction and the related frequency is shown in the horizontal direction. FIG. 5A typifies an OFDM receiver using diversity with FFT processing of the signal received by two systems comprising the "A" received wave obtained by the "A" system and the "B" received wave obtained by the "B" system. The signal data constitutes a plurality of different carriers. FFT processing is performed in each of these systems and then segmented into carrier units by the composite section 29. The resultant composite wave is adaptively compounded for each identical carrier in each system.

According to FIG. 5A, the input signals of each of the "A" system and the "B" system may generate a decline in the signal level (Refer to the white arrows K, L and M in the diagram) on different frequencies as a result of experiencing various interference in the path during transmission. However, in the present embodiment, composite processing is adaptively performed. In particular, the signal data after FFT processing in each system is segmented for each carrier in the composite section 29 so that the signal comprises an identical carrier in each system and always constitutes the maximum value acquired. In this method, a characteristic with a mostly flat frequency spectrum distribution similar to the transmitted wave can be acquired.

Additionally, in FIG. 5B, the Bit Error Rate (BER) is shown in the vertical direction and the Carrier to Noise Ratio CC/N) is shown in the horizontal direction. FIG. 5B is a diagram showing the C/N necessary to acquire the desired BER (BER≈2×1B–04), when shifting to a multipath state. The dashed line is one wave of Gaussian random noise. The chain double-dashed line is the BER characteristic of a conventional example (one which performs diversity based on a signal in the time domain). The solid line is the BER characteristic of the embodiment (one which performs diversity based on a signal in the frequency domain)

According to FIG. 5B, in order to acquire the desired error rate (BER≈2×1E–04), by the embodiment the carrier signal only has to attain a C/N of about 9.5 dB as contrasted with a C/N of about 15 dB needed for the conventional example. Thus, the embodiment in contrast with the conventional example, excellent reception can be achieved by acquiring a C/N of about 9.5 dB which is about 5.5 dB lower.

Based on the present invention, the signal data which constitutes the signal data of a plurality of different carriers outputted from the FFT sections, segmented into carrier units by the composite section 29 which then adaptively composites each identical carrier in each system, an OFDM receiver and OFDM reception method using diversity which especially lowers the error rate and has improved reception quality (C/N) can be provided.

While the present invention has been described with reference to the preferred embodiments, it is intended that the invention be not limited by any of the details of the description thereof.

As this invention can be embodied in several forms without departing from the spirit of the essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are intended to be embraced by the claims.

What is claimed is:

1. An Orthogonal Frequency Division Multiplexing (OFDM) receiver for receiving an OFDM signal, a symbol defining a transmission unit of the OFDM signal being produced by dividing data streams into a plurality of carriers which are within a predetermined bandwidth and which are modulated with orthogonal modulation, said OFDM receiver comprising:

a first system comprising an antenna which receives said OFDM signal and transform means for transforming said OFDM signal into a first carrier domain signal per said symbol; and a second system comprising an antenna which receives said OFDM signal and transform means for transforming said OFDM signal into a second carrier domain signal per said symbol; and composite means for generating a composite signal of a plurality of carriers transformed by said transform means of said first system and a plurality of carriers transformed by said transform means of said second system, wherein said composite means uses diversity characterized by adaptively combining each carrier transformed by said transform means of said first system and the same carrier transformed by said transform means of said second system;

wherein said composite means comprises:

difference value calculation means for calculating a difference value between a signal generated from a plurality of synchronizing signals included in said first carrier domain signal and a signal generated from a plurality of synchronizing signals included in said second carrier domain signal;

reciprocal calculation means for calculating a reciprocal of said difference value calculated by said difference value calculation means;

first multiplication means for multiplying said first carrier domain signal and said difference value calculated by said difference value calculation means;

second multiplication means for multiplying said second carrier domain signal and said reciprocal of said difference value calculated by said reciprocal calculation means; and addition means for adding a result of the multiplication by said first multiplication means and a result of the multiplication by said second multiplication means.

2. An Orthogonal Frequency Division Multiplexing (OFDM) receiving circuit for receiving an OFDM signal, a symbol defining a transmission unit of the OFDM signal being produced by dividing data streams into a plurality of carriers which are within a predetermined bandwidth and which are modulated with orthogonal modulation, said OFDM receiving circuit comprising:

a first system comprising an antenna which receives said OFDM signal and a transform circuit which transforms said OFDM signal into a first carrier domain signal per said symbol; and a second system comprising an antenna which receives said OFDM signal and a transform circuit which transforms said OFDM signal into a second carrier domain signal per said symbol; and a composite circuit for generating a composite signal of a plurality of carriers transformed by said transform circuit of said first system and a plurality of carriers transformed by said transform circuit of said second system, wherein said composite circuit uses diversity characterized by adaptively combining a carrier transformed by each said transform circuit of said first system and the same carrier transformed by said transform circuit of said second system;

wherein said composite circuit comprises:

a difference value calculation circuit for calculating a difference value between a signal generated from a plurality of synchronizing signals included in said first carrier domain signal and a signal generated from a plurality of synchronizing signals included in said second carrier domain signal;

a reciprocal calculation circuit for calculating a reciprocal of said difference value calculated by said difference value calculation circuit;

a first multiplication circuit for multiplying said first carrier domain signal and said difference value calculated by said difference value calculation circuit;

a second multiplication circuit for multiplying said second carrier domain signal and said reciprocal of said difference value calculated by said reciprocal calculation circuit; and an addition circuit for adding a result of the multiplication by said first multiplication circuit and a result of the multiplication by said second multiplication circuit.

3. An Orthogonal Frequency Division Multiplexing (OFDM) reception method for receiving an OFDM signal, a symbol defining a transmission unit of the OFDM signal being produced by dividing data streams into a plurality of carriers which are within a predetermined bandwidth and which are modulated with orthogonal modulation, said OFDM reception method comprising:

transforming said OFDM signal into a first carrier domain signal per said symbol, via a first system comprising an antenna which receives said OFDM signal; and transforming said OFDM signal into a second carrier domain signal per said symbol, via a second system comprising an antenna which receives said OFDM signal; and generating a composite signal of a plurality of carriers transformed via said first system and a plurality of carriers transformed via said second system, using diversity characterized by adaptively combining a carrier transformed via said first system and the same carrier transformed via said second system;

wherein said generating comprises:

calculating a difference value between a signal generated from a plurality of synchronizing signals included in said first carrier domain signal and a signal generated from a plurality of synchronizing signals included in said second carrier domain signal;

calculating a reciprocal of said difference value;

multiplying said first carrier domain signal and said difference value;

multiplying said second carrier domain signal and said reciprocal of said difference value; and adding (i) a result of the multiplication of said first carrier domain signal and said difference value and (ii) a result of the multiplication of said second carrier domain signal and said reciprocal of said difference value.

* * * * *